(12) United States Patent
Williams

(10) Patent No.: US 7,599,248 B2
(45) Date of Patent: Oct. 6, 2009

(54) METHOD AND APPARATUS FOR DETERMINING VECTOR ACOUSTIC INTENSITY

(75) Inventor: Earl G Williams, Fairfax, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 23 days.

(21) Appl. No.: 11/959,454

(22) Filed: Dec. 18, 2007

(65) Prior Publication Data

US 2008/0232192 A1    Sep. 25, 2008

Related U.S. Application Data

(60) Provisional application No. 60/870,463, filed on Dec. 18, 2006.

(51) Int. Cl.
*G03H 5/00* (2006.01)
(52) U.S. Cl. .......................................... 367/8
(58) Field of Classification Search ............... 367/8; 381/26; 348/515
See application file for complete search history.

(56) References Cited

U.S. PATENT DOCUMENTS

| | | | | |
|---|---|---|---|---|
| 4,415,996 | A | * | 11/1983 | Maynard et al. ............... 367/8 |
| H001330 | H | * | 7/1994 | Williams ....................... 367/8 |
| 5,592,441 | A | | 1/1997 | Kuhn |
| 6,172,940 | B1 | | 1/2001 | McConnell et al. |
| 7,058,184 | B1 | | 6/2006 | Hickling |
| 7,123,548 | B1 | | 10/2006 | Uzes |
| 2008/0232192 | A1 | * | 9/2008 | Williams ....................... 367/8 |
| 2009/0028347 | A1 | * | 1/2009 | Duraiswami et al. .......... 381/26 |

OTHER PUBLICATIONS

Herdic, P. C., Houston, B. H., Marcus, M. H., Williams, E.G., Baz, A. M., "The Vibro-Acoustic Response and Analysis of a Full-Scale Aircraft Fuselage Section for Interior Noise Reduction," Journal of the Acoustical Society of America, vol. 11, No. 6, pp. 3667-3678, Jun. 2005.

Houston, B. H., Marcus, M. H., Bucaro, J. A., Williams, E. G., Photiadis, D. M., "The Structural Acoustics and Active Control of Interior Noise in a Ribbed Cylindrical Shell," Journal of the Acoustical Society of America, vol. 99, No. 6, pp. 3497-3512, Jun. 1996.

Sklanka, B. J., Tuss, J. R., Buehrle, R. D., Klos, J., Williams, E. G., Valdivia, N., "Acoustic Source Localization in Aircraft Interiors Using Microphone Array Technologies", paper No. AIAA-2006-2714, 12th AIAA/CEAS Aeroacoustics Conference, Cambridge MA, May 2006.

Valdivia, N.P., Williams, E.G., "Reconstruction of the acoustic field using patch surface measurements", Proceedings Thirteenth International Congress on Sound and Vibration, Vienna, Austria, Jul. 2006.

(Continued)

*Primary Examiner*—Dan Pihulic
(74) *Attorney, Agent, or Firm*—John J Karasek; Sally A Ferrett

(57) ABSTRACT

A system and method for determining vector acoustic intensity fields using a spherical array of acoustic sensors, and a regularization technique. A mobile spherical array of a number of microphones that image the acoustic intensity vector throughout a large volume internal and external to the spherical array.

22 Claims, 10 Drawing Sheets

OTHER PUBLICATIONS

Williams, E. G., et al., "Tracking energy flow using a Volumetric Acoustic Intensity Imager (VAIM)", presentation slides, Inter-noise 2006, Hawaii, Dec. 5, 2006, pp. 1-25.

Williams, E.G., "A Volumetic Acoustic Intensity Probe based on Spherical Nearfield Acoustical Holography", Proceedings Thirteenth International Congress on Sound and Vibration, Vienna, Austria, Jul. 2006.

Williams, E. G., Fourier Acoustics: Sound Radiation and Nearfield Acoustical Holography, Academic Press Inc., 1999, Ch. 7, pp. 235-249.

Williams, E.G., "Volumetric Acoustic Intensity Probe", 2006 NRL Review, pp. 107-108, Dec. 2006.

Williams, E. G., "Continuation of Acoustic Near-Fields," Journal of the Acoustical Society of America, vol. 113, No. 3, pp. 1273-1281, Mar. 2003.

Williams, E. G., "Regularization Methods for Near-Field Acoustical Holography," Journal of the Acoustical Society of America, vol. 110, No. 4, pp. 1976-1988, Oct. 2001.

Williams, E. G., Valdivia, N., Herdic, P. C., Klos, J., "Volumetric Acoustic Vector Intensity Imager," Journal of the Acoustical Society of America, vol. 120, No. 4, pp. 1887-1897, Oct. 2006.

Williams, E. G., Valdivia, N.P., Klos, J., "Tracking energy flow using a Volumetric Acoustic Intensity Imager (VAIM)", paper presented at Inter-noise 2006, Hawaii, Dec. 3-6, 2006, pp. 1-10.

Williams, E. G., Houston, B. H., Herdic, P. C., Raveendra, S. T., Gardner, B., "Interior Near-Field Acoustical Holography in Flight," Journal of the Acoustical Society of America, vol. 108, No. 4, pp. 1451-1463, Oct. 2000.

Williams, E. G., Houston, B. H., Herdic, P. C., "Fast Fourier Transform and Singular Value Decomposition Formulations for Patch Near-Field Acoustical Holography," Journal of the Acoustical Society of America, vol. 114, No. 3, pp. 1322-1333, Sep. 2003.

* cited by examiner

| MIC. NO. | X | Y | Z | MIC. NO. | X | Y | Z |
|---|---|---|---|---|---|---|---|
| 1 | 1 | 0 | 0 | | | | |
| 2 | 0 | 1 | 0 | 27 | .301511 | .301511 | .904534 |
| 3 | 0 | 0 | 1 | 28 | .301511 | .301511 | -.904534 |
| 4 | -1 | 0 | 0 | 29 | .301511 | -.301511 | .904534 |
| 5 | 0 | -1 | 0 | 30 | .301511 | -.301511 | -.904534 |
| 6 | 0 | 0 | -1 | 31 | -.301511 | .301511 | .904534 |
| 7 | .707107 | .707107 | 0 | 32 | -.301511 | .301511 | -.904534 |
| 8 | .707107 | 0 | .707107 | 33 | -.301511 | -.301511 | .904534 |
| 9 | 0 | .707107 | .707107 | 34 | -.301511 | -.301511 | -.904534 |
| 10 | -.707107 | -.707107 | 0 | 35 | .301511 | .904534 | .301511 |
| 11 | -.707107 | 0 | -.707107 | 36 | .301511 | .904534 | -.301511 |
| 12 | 0 | -.707107 | -.707107 | 37 | .301511 | -.904534 | .301511 |
| 13 | .707107 | -.707107 | 0 | 38 | .301511 | -.904534 | -.301511 |
| 14 | .707107 | 0 | -.707107 | 39 | -.301511 | .904534 | .301511 |
| 15 | -.707107 | .707107 | 0 | 40 | -.301511 | .904534 | -.301511 |
| 16 | -.707107 | 0 | .707107 | 41 | -.301511 | -.904534 | .301511 |
| 17 | 0 | .707107 | -.707107 | 42 | -.301511 | -.904534 | -.301511 |
| 18 | 0 | -.707107 | .707107 | 43 | .904534 | .301511 | .301511 |
| 19 | .57735 | .57735 | .57735 | 44 | .904534 | .301511 | -.301511 |
| 20 | .57735 | .57735 | -.57735 | 45 | .904534 | -.301511 | .301511 |
| 21 | .57735 | -.57735 | .57735 | 46 | .904534 | -.301511 | -.301511 |
| 22 | .57735 | -.57735 | -.57735 | 47 | -.904534 | .301511 | .301511 |
| 23 | -.57735 | .57735 | .57735 | 48 | -.904534 | .301511 | -.301511 |
| 24 | -.57735 | .57735 | -.57735 | 49 | -.904534 | -.301511 | .301511 |
| 25 | -.57735 | -.57735 | .57735 | 50 | -.904534 | -.301511 | -.301511 |
| 26 | -.57735 | -.57735 | -.57735 | | | | |

FIG. 3

THE FILTER TABLE IS SHOWN HERE SHOWING THE VALUES OF N AS A FUNCTION OF FREQUENCY AND SNR.

| SNR(db) \ r(Hz) | 50 | 100 | 150 | 200 | 250 | 300 | 350 | 400 | 450 | 500 | 550 | 600 | 650 | 700 | 750 | 800 | 850 | 900 | 950 | 1000 |
|---|---|---|---|---|---|---|---|---|---|---|---|---|---|---|---|---|---|---|---|---|
| 3  | 1 | 1 | 1 | 1 | 1 | 1 | 1 | 2 | 2 | 2 | 2 | 2 | 2 | 3 | 3 | 3 | 2 | 3 | 3 | 4 |
| 6  | 1 | 1 | 1 | 1 | 1 | 1 | 2 | 2 | 2 | 2 | 2 | 2 | 3 | 3 | 3 | 3 | 2 | 4 | 4 | 4 |
| 9  | 1 | 1 | 1 | 1 | 1 | 2 | 2 | 2 | 2 | 3 | 3 | 3 | 3 | 3 | 3 | 4 | 3 | 4 | 4 | 4 |
| 12 | 1 | 1 | 1 | 2 | 2 | 2 | 2 | 3 | 3 | 3 | 3 | 3 | 3 | 4 | 4 | 4 | 4 | 5 | 5 | 5 |
| 15 | 1 | 1 | 1 | 2 | 2 | 2 | 2 | 3 | 3 | 3 | 3 | 4 | 4 | 4 | 4 | 5 | 5 | 5 | 5 | 5 |
| 18 | 1 | 1 | 2 | 2 | 2 | 3 | 3 | 3 | 4 | 4 | 4 | 4 | 4 | 5 | 5 | 5 | 5 | 5 | 5 | 5 |
| 21 | 1 | 1 | 2 | 2 | 3 | 3 | 3 | 3 | 4 | 4 | 4 | 4 | 5 | 5 | 5 | 5 | 5 | 5 | 5 | 5 |
| 24 | 1 | 2 | 2 | 3 | 3 | 3 | 3 | 3 | 4 | 4 | 4 | 4 | 5 | 5 | 5 | 5 | 5 | 5 | 5 | 5 |
| 27 | 1 | 2 | 2 | 3 | 3 | 3 | 3 | 4 | 4 | 4 | 5 | 5 | 5 | 5 | 5 | 5 | 5 | 5 | 5 | 5 |
| 30 | 1 | 2 | 3 | 3 | 3 | 3 | 4 | 4 | 4 | 5 | 5 | 5 | 5 | 5 | 5 | 5 | 5 | 5 | 5 | 5 |
| 33 | 1 | 2 | 3 | 3 | 3 | 4 | 4 | 4 | 4 | 5 | 5 | 5 | 5 | 5 | 5 | 5 | 5 | 5 | 5 | 5 |
| 36 | 2 | 2 | 3 | 3 | 3 | 4 | 4 | 4 | 4 | 5 | 5 | 5 | 5 | 5 | 5 | 5 | 5 | 5 | 5 | 5 |
| 39 | 2 | 2 | 3 | 3 | 3 | 4 | 4 | 4 | 4 | 5 | 5 | 5 | 5 | 5 | 5 | 5 | 5 | 5 | 5 | 5 |
| 42 | 2 | 2 | 3 | 3 | 3 | 4 | 4 | 4 | 4 | 5 | 5 | 5 | 5 | 5 | 5 | 5 | 5 | 5 | 5 | 5 |
| 45 | 2 | 2 | 3 | 3 | 3 | 4 | 4 | 4 | 5 | 5 | 5 | 5 | 5 | 5 | 5 | 5 | 5 | 5 | 5 | 5 |
| 48 | 2 | 3 | 3 | 3 | 4 | 4 | 4 | 4 | 5 | 5 | 5 | 5 | 5 | 5 | 5 | 5 | 5 | 5 | 5 | 5 |

FIG. 4

METHOD AND APPARATUS FOR DETERMINING VECTOR ACOUSTIC INTENSITY

CROSS-REFERENCE TO RELATED APPLICATIONS

This Application is a nonprovisional application of provisional application (35 USC 119(e)) Ser. No. 60/870,463 filed on Dec. 18, 2006, the entire disclosure of which is incorporated herein by reference.

BACKGROUND

1. Technical Field

This application is related to measurement of acoustic intensity, and more particularly, to acoustic intensity probes with more than one microphone.

2. Description of Related Technology

Microphones and microphone arrays are often used to measure sound pressure levels, for various reasons, for example, to isolate the mechanical source of a troublesome noise. To determine a sound intensity vector, current devices typically include one, two, or three pairs of microphones. For example, a four-microphone sound intensity vector probe is described in U.S. Pat. No. 7,058,184 to Hickling, the disclosure of which is incorporated herein by reference in its entirety. An underwater acoustic intensity probe with a pair of geophones is described in commonly assigned U.S. Pat. No. 6,172,940 to McConnell et al., the disclosure of which is incorporated herein in its entirety.

A spherical microphone array for detecting, tracking, and reconstructing signals in spectrally competitive environments is disclosed in U.S. Pat. No. 7,123,548 to Uzes.

Aspects of near field acoustic holography (NAH) are discussed in Nicholas P. Valdiva and Earl G. Williams, "Reconstruction of the acoustic field using patch surface measurements", presented at the Thirteenth International Congress on Sound and Vibration on Jul. 2-6, 2006. Additional aspects are discussed in *Fourier Acoustics, Sound Radiation and Nearfield Acoustical Holography*, Earl G. Williams, Academic Press, London, 1999, Chapters 6 and 7.

Aspects of a volumetric acoustic intensity probe are discussed in B. Sklanka et. al., "Acoustic Source Localization in Aircraft Interiors Using Microphone Array Technologies", paper no. AIAA-2006-2714, 12th AIAA/CEAS Aeroacoustics Conference, Cambridge Mass., presented on May 8-10, 2006, and in E. G. Williams, N. Valdivia, P. C. Herdic, and Jacob Klos "Volumetric Acoustic Vector Intensity Imager", Journal of the Acoustic Society of America, Volume 120, Issue 4, pages 1887-1897, October 2006.

Additional discussion of volumetric acoustic intensity probes is found in Earl G. Williams, "A Volumetric Acoustic Intensity Probe based on Spherical Nearfield Acoustical Holography", Proceedings 13th International Congress on Sound and Vibration, Vienna, Austria, July 2006, and in Nicolas Valdivia, Earl G. Williams, "Reconstruction of the acoustic field using partial surface measurements", Proceedings 13th International Congress on Sound and Vibration, Vienna, Austria, July 2006, and in Earl G. Williams, "A Volumetric Acoustic Intensity Probe based on Spherical Nearfield Acoustical Holography", presented at the Thirteenth International Conference on Spherical Nearfield Acoustical Holography, on Jul. 2-6, 2006. Further aspects are discussed in Earl. G. Williams, Nicholas P. Valdiva, and Jacob Klos, "Tracking energy flow using a Volumetric Acoustic Intensity Imager (VAIM)", Internoise 2006, held on 3-6 Dec. 2006, and in Earl G. Williams, "Volumetric Acoustic Intensity Probe", NRL Review, 2006.

BRIEF SUMMARY OF THE INVENTION

An embodiment of the invention is directed to a system for determining acoustic intensity at locations inside and outside a spherical array of microphones. The system includes a spherical array of a plurality of microphones, an analog to digital converter for digitizing pressure data from each microphone, and a processor for determining the acoustic intensity at each location, the processor having computer software adapted to apply a regularization filter to spherical wave equations for pressure and velocity.

The regularization filter can be a predetermined integer dependent on the signal to noise ratio and the frequency. The predetermined integer is higher for larger signal to noise ratios and frequencies. In one embodiment, the spherical array has 50 microphones and the predetermined integer is in the range of 1 to 5 for frequencies between 50 and 1000 Hz.

In an embodiment of the invention, the processor applies the regularization filter to spherical wave equations for pressure and velocity by applying a regularization term to $$\sum_{n=0}^{N} \frac{j_n(kr)}{j_n(ka)}$$

to the spherical wave equations, where $j_n$ is a spherical Bessel function, k is the wave number, r is the location where the acoustic intensity is determined, and a is the radius of the spherical array.

In an embodiment of the invention, the acoustic pressure at a location is found according to $$p(r, \theta, \phi) = \sum_{n=0}^{N} \frac{j_n(kr)}{j_n(ka)} \sum_{m=-n}^{n} Y_n^m(\theta, \phi) \sum_{i=1}^{50} Y_n^m(\Omega_i) * \omega_i p_h(a, \Omega_i),$$

wherein $p(r,\theta,\phi)$ is the reconstructed acoustic pressure at a location $r,\theta,\phi$, the $Y_n^m(\theta,\phi)$ values are orthonormal spherical harmonic functions of degree n and order m at a point in the volume at angle $(\theta,\phi)$, $p_h(a,\Omega_i)$ is the measured pressure, $Y_n^m(\Omega_i)$ are the precomputed spherical harmonics at the spherical angle $\Omega_i$ of the ith microphone in the array, $\omega_i$ values are quadrature weights, and $\rho$ is the density of the media in which the array is located.

In an embodiment of the invention, the acoustic velocity is found, for example, in the theta direction, as $$\dot{u}(r, \theta, \phi) = \frac{1}{i\rho c k} \sum_{n=0}^{N} \frac{j_n(kr)}{r j_n(ka)} \sum_{m=-n}^{n} \frac{\partial Y_n^m(\theta, \phi)}{\partial \theta} \sum_{i=1}^{50} Y_n^m(\Omega_i) * \omega_i p_h(a, \Omega_i),$$

wherein $p(r,\theta,\phi)$ is the reconstructed acoustic pressure at a location $r,\theta,\phi$, the $Y_n^m(\theta,\phi)$ values are orthonormal spherical harmonic functions of degree n and order m at a point in the volume at angle $(\theta,\phi)$, $p_h(a,\Omega_i)$ is the measured pressure, $Y_n^m(\Omega_i)$ are the precomputed spherical harmonics at the spherical angle $\Omega_i$ of the ith microphone in the array, $\omega_i$ values are quadrature weights, and ρ is the density of the media in which the array is located.

In an embodiment of the invention, the acoustic intensity is determined at locations within a volume having a radius about two times the radius of the spherical array of microphones.

The system can also include a display adapted to show magnitude and direction of calculated acoustic intensity at the locations within and outside the spherical array. The display illustrates at least the partial intensity field having the highest average coherence for a frequency, or a plurality of partial intensity fields, ranked in the order of highest average coherence for a frequency.

Embodiments of the invention are also directed to computer-implemented methods, software, and computer readable media having software for implementing these methods.

A more complete appreciation of the invention will be readily obtained by reference to the following example embodiments and the accompanying drawings.

BRIEF DESCRIPTION OF THE DRAWINGS

FIG. 3 is table showing locations for microphones in Cartesian coordinates with the origin at the center of the sphere according to an embodiment of the invention.

FIG. 4 is a table of predetermined regularization filters N as a function of frequency and signal to noise ratio for a 50 element spherical array in accordance with an embodiment of the invention.

FIGS. 7, 8, and 9 illustrate displays of the first partial field, second partial field, and third partial field of vector intensities with a point source on.

DETAILED DESCRIPTION OF EMBODIMENTS OF THE INVENTION

Embodiments of the invention described herein are directed to methods and apparatus for determining acoustic intensity vector maps in a volume using a spherical array of acoustic sensors. The volume includes both the spherical space interior to the spherical array and a spherical space external to the spherical array.

Figure 1A:
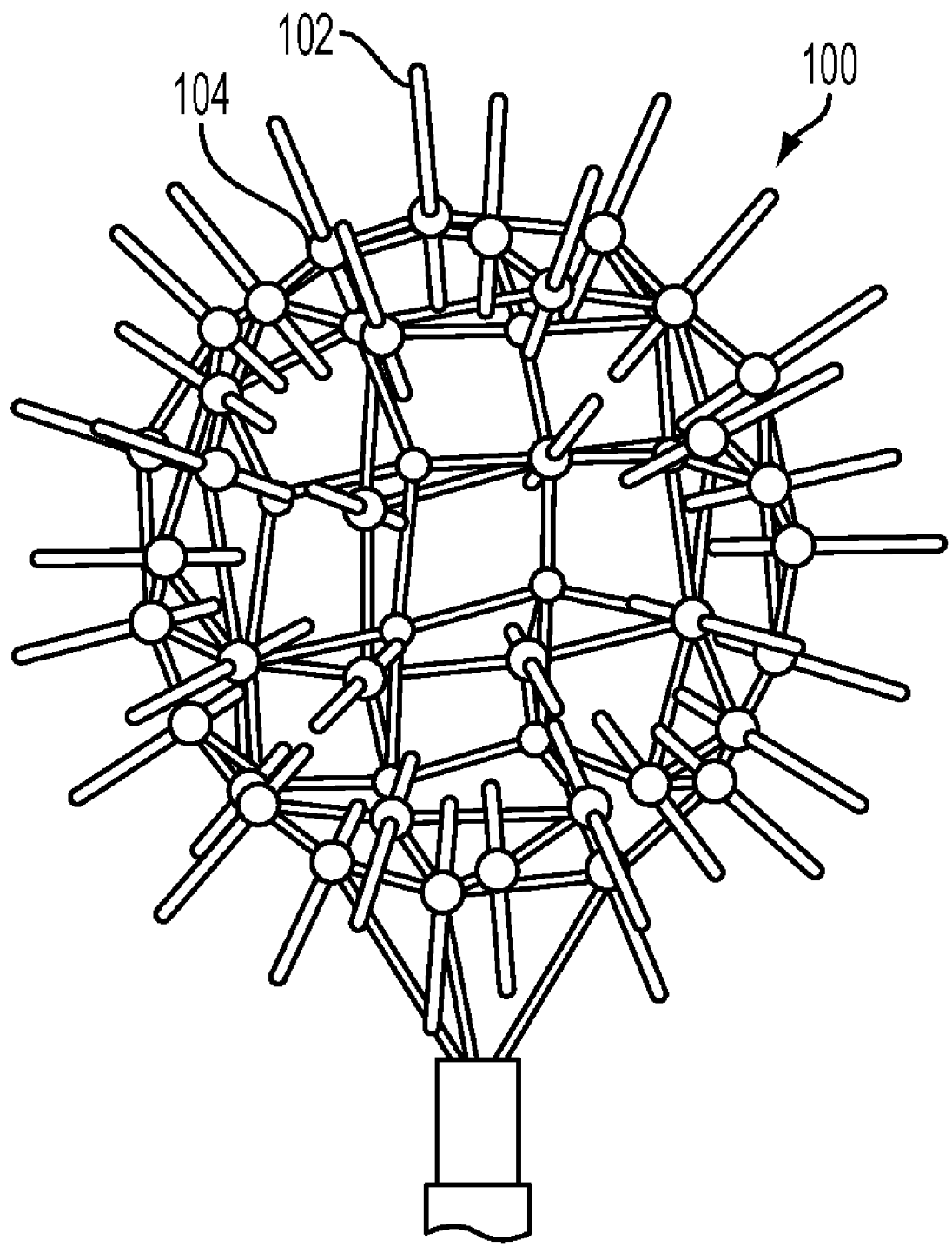
FIG. 1A illustrates a spherical microphone array in accordance with an embodiment of the invention.

FIG. 1A illustrates an exemplary embodiment of a spherical array according to an embodiment of the invention. The array 100 includes a number of microphones 102 held in position by a rigid frame 104 that is preferably acoustically transparent. In this example, 50 microphones 102 are arranged in a spherical array with a radius of 0.2 meters.

Figure 1B:
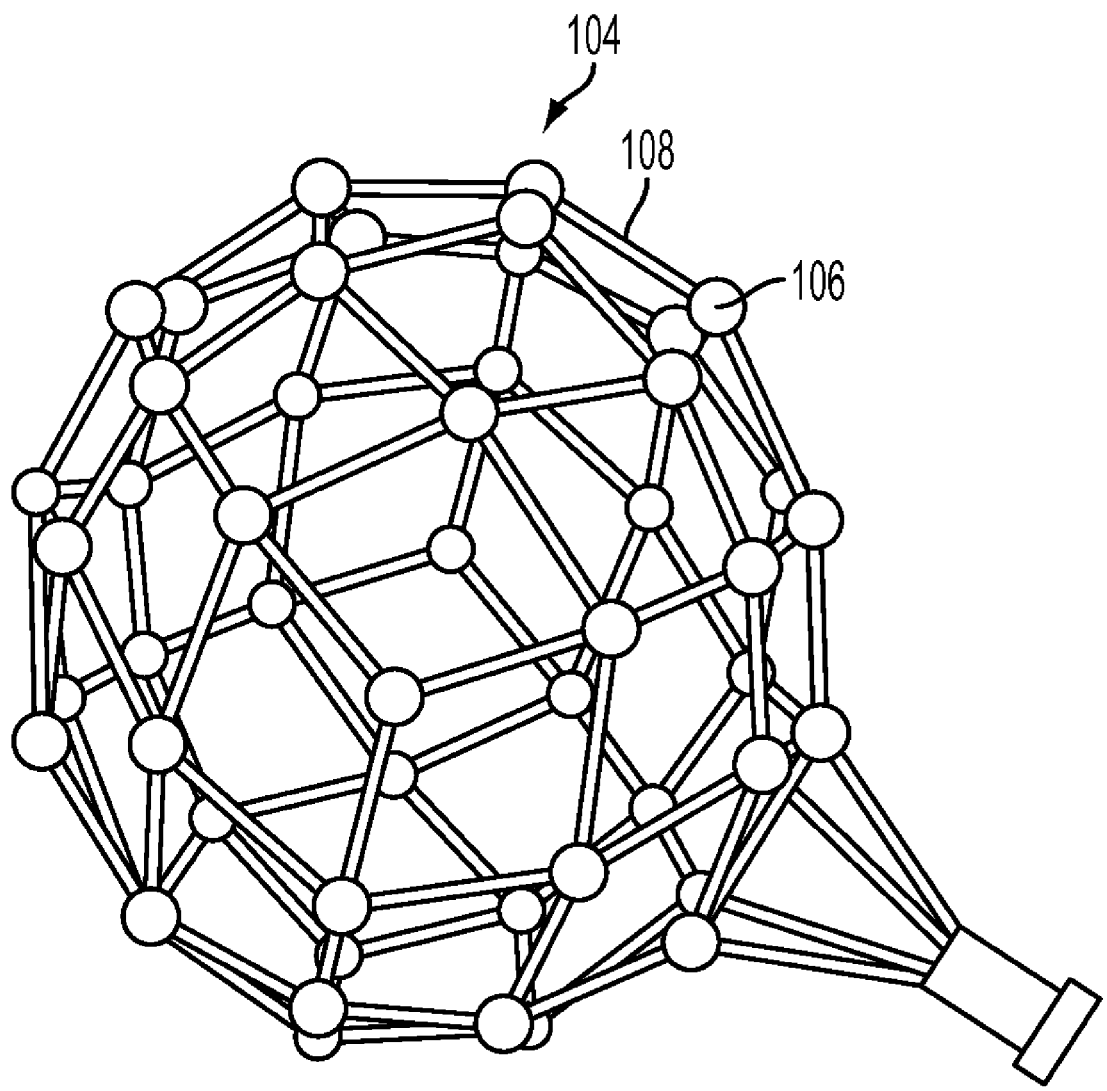
FIG. 1B illustrates a frame for the spherical microphone array of FIG. 1A.

FIG. 1B illustrates the frame 104 used to hold the microphones in position. The frame is preferably formed of a lightweight, rigid, substantially acoustically transparent material such as nickel. Connectors 106 hold the microphones 102 in position and are held in position by the thin rigid beams 108.

The array can be larger or smaller in size, and can have greater or fewer microphones, as determined by the cost of the microphones, the cost of electronics per channel, the desired volume, and the desired resolution.

Figure 2:
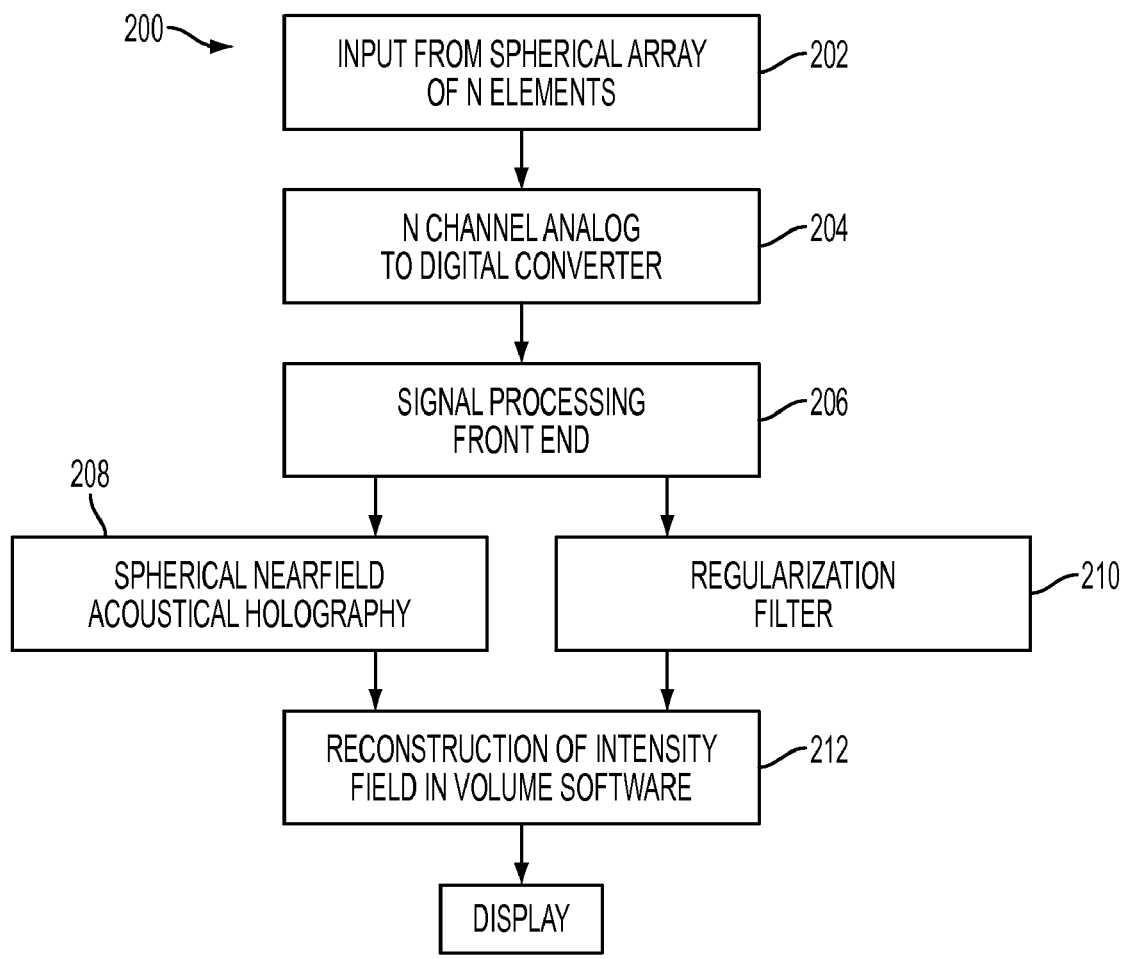
FIG. 2 illustrates steps in the exemplary method for determining acoustic intensity vector maps in a volume using a spherical array of acoustic sensors in accordance with an embodiment of the invention.

FIG. 2 illustrates a schematic of a method 200 for determining acoustic intensity vectors in a volume using a spherical array of acoustic sensors according to an embodiment of the invention.

In a first mode of operation, an "instantaneous mode", the array microphones are simultaneously sampled for a period of time at a sampling rate. The data 202 is transformed using an analog to digital converter 204. A FFT transforms the digitized time domain data into frequency domain information. At one frequency, the equations for intensity are applied and vector intensity is determined. Subsequently, the sampled data from the next block of time is considered.

Note that in a second mode of operation, the system uses partial field decomposition to determine the effect of various acoustic sources on the vector intensity field. In this mode, accelerometers or other sensors are located on suspected noise sources. The accelerometers are sampled, the analog samples are converted to digital, and the digitized data is transformed with a FFT into the frequency domain.

Spherical NAH Using Regularization Filters

For spherical arrays of microphones, the acoustic intensity fields $p(r,\theta,\phi)$ within a spherical volume of radius 2R centered at the sphere, at a frequency ω, are found according to the following triple sum, which includes a normalization term $$\sum_{n=0}^{N} \frac{j_n(kr)}{j_n(ka)}:$$

$$p(r, \theta, \phi) = \quad \text{Equation (1)}$$

$$\sum_{n=0}^{N} \frac{j_n(kr)}{j_n(ka)} \sum_{m=-n}^{n} Y_n^m(\theta, \phi) \sum_{i=1}^{50} Y_n^m(\Omega_i) * \omega_i p_h(a, \Omega_i).$$

The velocity components $\dot{u}(r,\theta,\phi)$, $\dot{v}(r,\theta,\phi)$, and $\dot{w}(r,\theta,\phi)$, in the x, y, and z directions, respectively, at a frequency ω are found according to the following equations:

$$\dot{u}(r, \theta, \phi) = \quad \text{Equation (2)}$$

$$\frac{1}{i\rho c k} \sum_{n=0}^{N} \frac{j_n(kr)}{r j_n(ka)} \sum_{m=-n}^{n} \frac{\partial Y_n^m(\theta, \phi)}{\partial \theta} \sum_{i=1}^{50} Y_n^m(\Omega_i) * \omega_i p_h(a, \Omega_i)$$

$$\dot{v}(r, \theta, \phi) = \quad \text{Equation (3)}$$

$$\frac{1}{i\rho c k} \sum_{n=0}^{N} \frac{j_n(kr)}{r j_n(ka)} \sum_{m=-n}^{n} \frac{i m Y_n^m(\theta, \phi)}{\sin\theta} \sum_{i=1}^{50} Y_n^m(\Omega_i) * \omega_i p_h(a, \Omega_i)$$

$$\dot{w}(r, \theta, \varphi) = \quad \text{Equation (4)}$$

$$\frac{1}{i\rho c} \sum_{n=0}^{N} \frac{j'_n(kr)}{j_n(ka)} \sum_{m=-n}^{n} Y_n^m(\theta, \varphi) \sum_{i=1}^{50} Y_n^m(\Omega_i) * \omega_i p_h(a, \Omega_i).$$

Here, $p(r,\theta,\phi)$ is the "reconstructed" acoustic pressure at a location r, $\theta$, $\phi$ within a spherical volume V centered at the center of the spherical away and extending to a radius R=2a, which is twice the array radius a. The radial distance from the origin is r, where r is less than or equal to R=2a. The $Y_n^m(\theta,\phi)$ values are orthonormal spherical harmonic functions of degree n and order m at a point in the volume at angle $(\theta,\phi)$. The acoustic wave number is k with k=$\omega$/c, where $\omega$ is the angular acoustic frequency of interest. The asterisk * denotes the complex conjugate. The $p_h(a,\Omega_i)$ is the measured pressure and $Y_n^m(\Omega_i)$ are the precomputed spherical harmonics at the spherical angle $\Omega_i$ of the ith microphone in the array. The $\omega_i$ values are quadrature weights. The value of a is the radius of the array (e.g., 0.2 meters). The density of the media in which the array is located is $\rho$. The $j_n(kr)$ and $j_n(ka)$ are spherical Bessel functions. The velocity equations also include the propagator term $$\sum_{n=0}^{N} \frac{j_n(kr)}{j_n(ka)}.$$

Note that a spherical Bessel function $j_n(x)$ is related to an ordinary Bessel functions $J_n(x)$ according to $$j_n(x) = \sqrt{\frac{\pi}{2x}} J_{n+1/2}(x). \qquad \text{Equation (5)}$$

The summation term $$\sum_{i=1}^{50} Y_n^m(\Omega_i) * \omega_i p_h(a, \Omega_i)$$

in each of the pressure and velocity equations is the Fourier coefficient.

The value n is incremented from 0 to N, where N reflects a regularization filter factor that depends on the frequency and signal to noise ratio, as described further in later paragraphs.

The table in FIG. 3 provides the locations of the microphones 102 in cartesian coordinates with the origin at the center of the sphere, based on an array radius of 1.0 meters. For an array with a different radius, multiply the x, y, and z coordinates from the table by the radius a of the sphere. For example, for a spherical array with a radius of 0.2 meters, microphone #1 would be positioned at x=0.2 m, y=0 m, z=0 m.

The microphone locations shown in FIG. 3 correspond to microphones positioned on points on a sphere so that the spherical harmonics of the partial fields are integrated exactly using the quadrature weights $\omega_i$. Note that the partial fields are decomposed into a set of spherical harmonics during the processing up to a value of N. Here, based on the filter table, up to five harmonics will be used.

The corresponding weights for the 50 microphone array above are as follows. For microphone group a1 (microphones 1-6), the $\omega_i$ is 64/2835. For microphone group a2 (microphones 7-18), the $\omega_i$ is 4/315. For microphone group a3 (microphones 19-26), the $\omega_i$ is 27/1280. For microphone group b1 (microphones 27-50), the $\omega_i$ is $11^4/725760$.

For low frequencies, e.g., below about 1000 Hz, a predetermined regularization filter 210 is applied. The filter setting depends on the signal to noise ratio (SNR) of the microphone array and the frequency f. In an exemplary embodiment, a filter value table is predetermined and stored in software for use in the equations for the acoustic intensity and velocity fields above. FIG. 4 shows the values of N as a function of frequency and signal to noise ratio for a 50 element spherical array, for frequencies from 50 to 1000 Hz and SNRs from 3 to 48 dB.

The signal to noise ratio is determined by the following equations, or other suitable equations, for use in the table of FIG. 4.

$$\sigma = \|(P_n^m/B_n^m)\|_2/\sqrt{13} \text{ norm for } n=6, m=-6, -5, \ldots 6 \qquad \text{Equation (7)}$$

$$B_n^m = \|Y_n^m(\Omega_i) * \omega_i\|_2 \qquad \text{Equation (8)}$$

$$SNR = 20 \log_{10}(\|p_h(a,\Omega_i)\|_2/(\sigma\sqrt{50})) \qquad \text{Equation (9)}$$

where the Fourier coefficients $P_n^m$ of the pressure are defined by $$P_n^m \equiv \sum_{i=1}^{50} Y_n^m(\Omega_i) * \omega_i p_h(a, \Omega_i). \qquad \text{Equation (10)}$$

As illustrated in FIG. 4, as the signal to noise ratio and the frequency increases, the value of N increases from 1 to a maximum of 5. For arrays with a larger number of microphones, the maximum N can be greater than 5.

This regularization filter is applied through the pressure and velocity equations above as a summation over the regularization filter integer N from n=0 to N shown as $$\sum_{n=0}^{N} \frac{j_n(kr)}{r j_n(ka)}(\ldots)$$

in the equations for the pressure and velocity above. The weights $\omega_i$ allow accurate determination of the Fourier coefficients for all 50 microphone positions. The purpose of the regularization filter is to minimize error which can arise in reconstructing the pressure and velocity vector fields as a function of r in the presence of noise. An estimate of error, assuming spatially coherent Gaussian noise in the microphones, is found in Chapter 7 of *Fourier Acoustics, Sound Radiation and Nearfield Acoustical Holography*, Earl G. Williams, Academic Press, London, 1999.

Note that if the number of microphones is different than 50, the number of microphones is substituted for 50 in the equations for SNR and $P_n^m$ above. The locations $\Omega_i$ and weights $\omega_i$ change correspondingly.

Having determined the acoustic pressure p and the velocities, the vector intensity is found at any point in the volume as the product of the pressure and velocity, with units of energy per unit time (power) per unit area, typically (joules/s)/m² or watts/m². The value of the average acoustic intensity over a period T is found using the reconstructed pressure $p(r,\theta,\phi)$ and volume from the equations above as $$\vec{I}(r, \theta, \phi) = \frac{1}{2}\text{Re}\{p(r, \theta, \phi)(\dot{u}\hat{i} + \dot{v}\hat{j} + \dot{w}\hat{k})^*\}. \qquad \text{Equation (11)}$$

The intensity for each of the six partial fields can be displayed separately or added together to produce a single display.

Figure 5A:
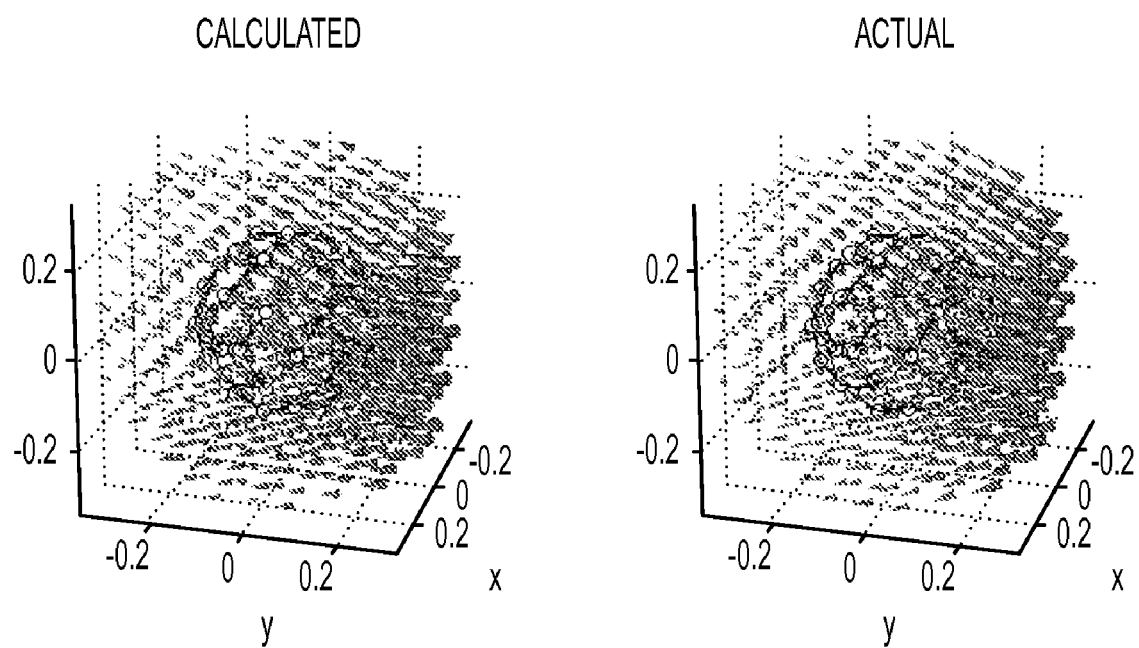
FIG. 5A-5C illustrates the vector acoustic intensity graphically for different frequencies ω.
Figure 5B:
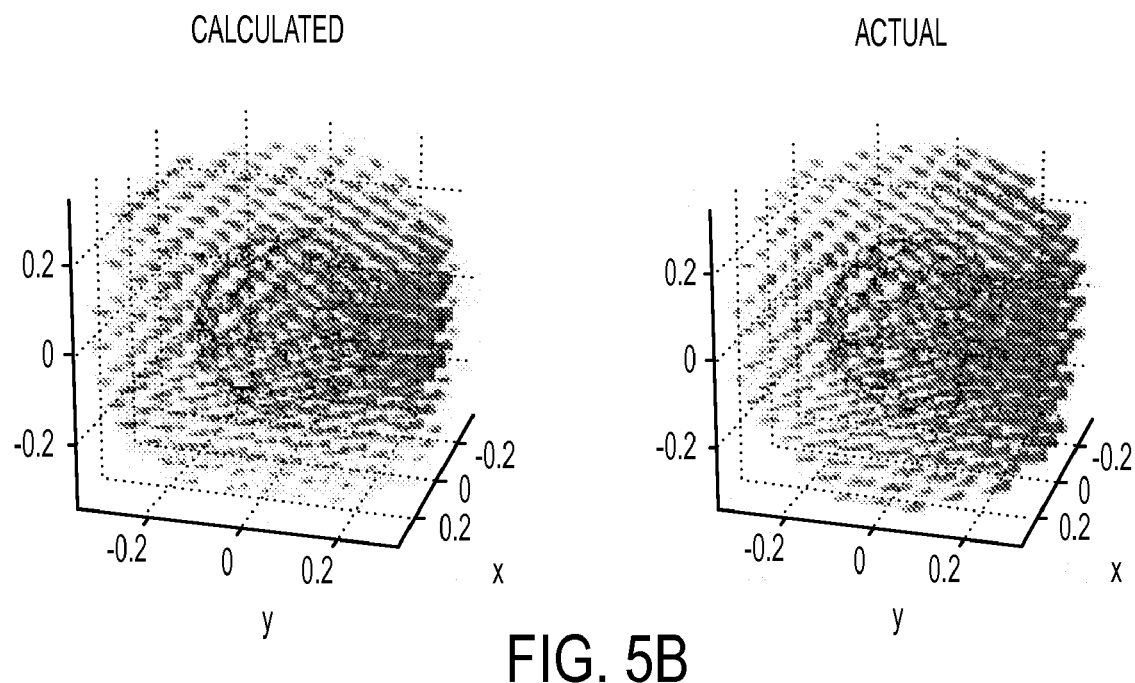
Figure 5C:
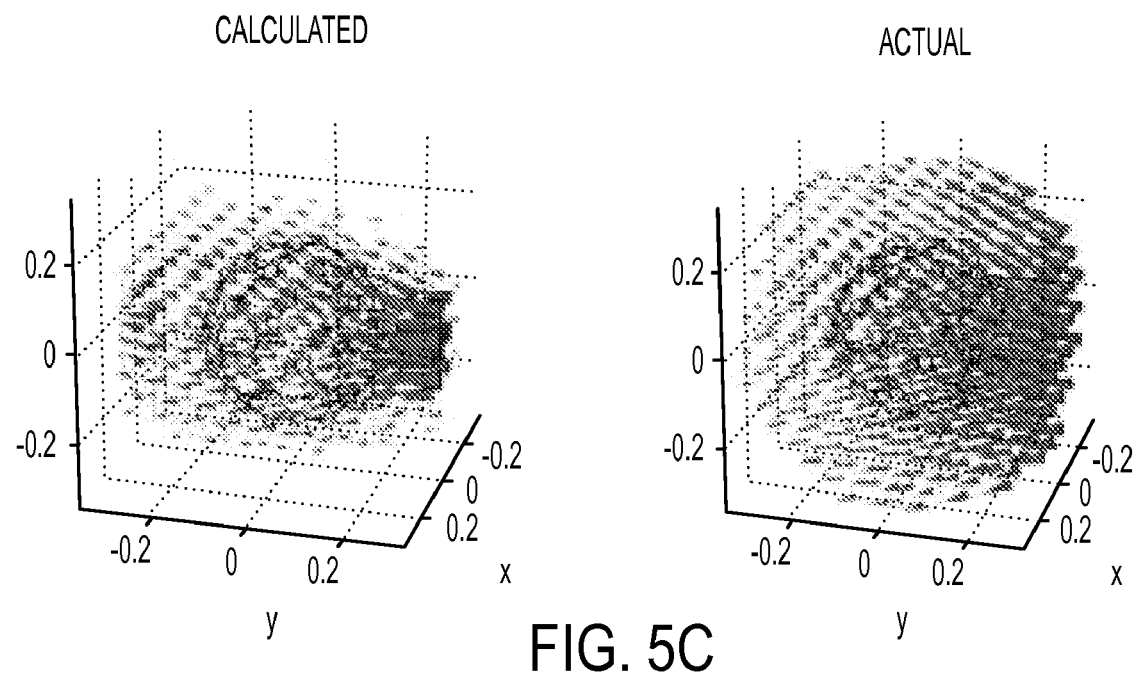

In an exemplary embodiment, the system includes a display that shows the vector intensity at various locations in the volume of radius 2a. The magnitude of the intensity can be illustrated using a color change or as the length of an arrow, bar or other visual device, with the vector intensity display changing over time. FIG. 5A-5C illustrates the vector acoustic intensity graphically for different ω. FIG. 5A compares the reconstructed vector intensity signal with the exact field at 250 Hz and 25 dB SNR. FIG. 5B compares the reconstructed vector intensity signal with the exact field at 800 Hz and 25 dB SNR. FIG. 5C compares the reconstructed vector intensity signal with the exact field at 1150 Hz and 25 dB SNR. In FIG. 5A-5C, the length of each cone is proportional to the strength of the intensity (watts/m$^2$) at that grid point, and the cone points in the direction of the resulting vector. In an exemplary embodiment, displays show results for each frequency of interest, and in ⅓ octave bands.

In an exemplary embodiment, the display can be shown on a computer monitor screen, or any display screen or device receiving results from the processor that determines the vector intensity.

Figure 6:
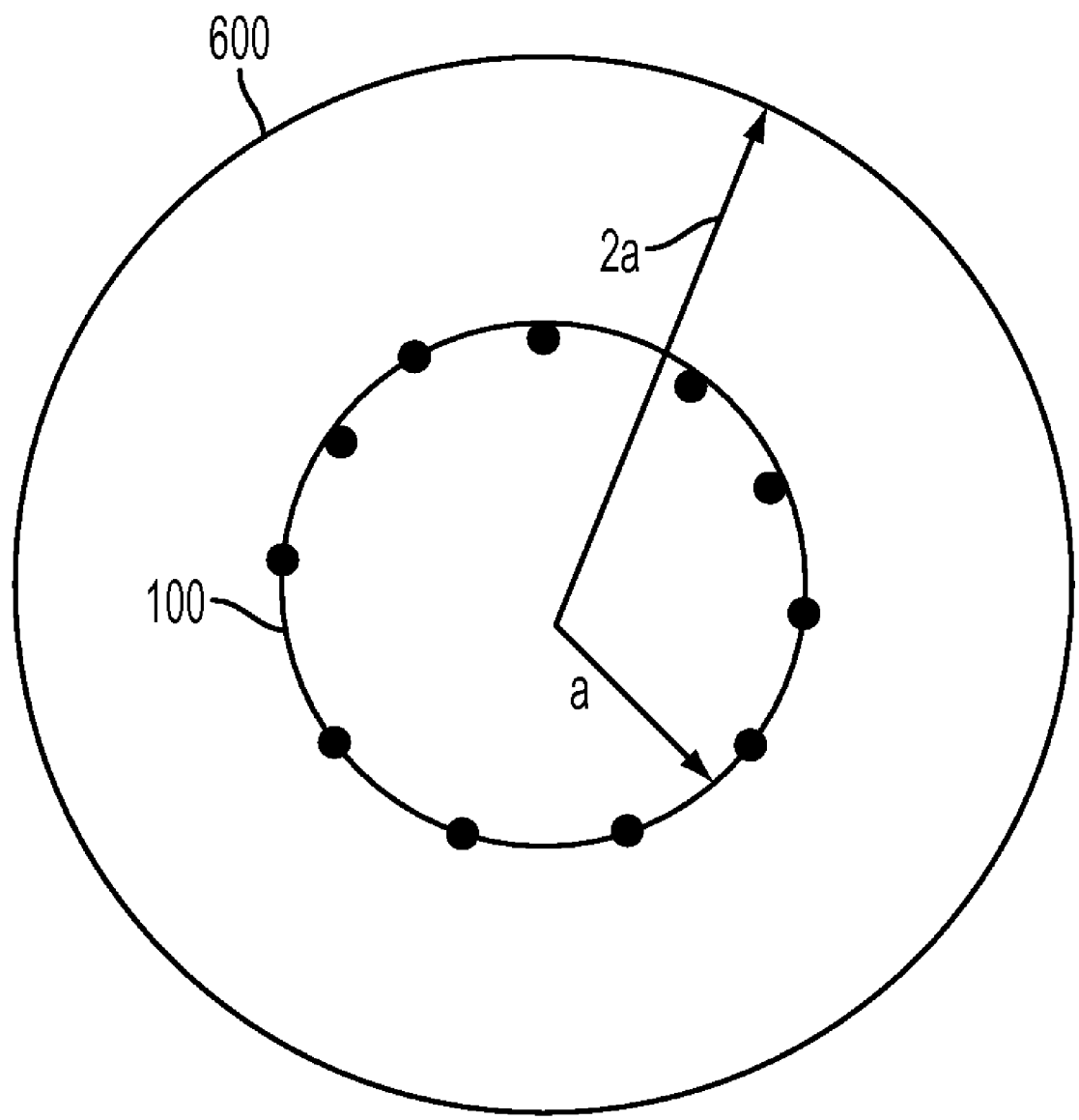
FIG. 6 illustrates the volume for which the acoustical intensity fields can be determined compared to the volume of the spherical array.

As discussed above, and as illustrated in FIG. 6, the acoustical intensity fields can be determined using the equations above over the entire volume 600 of radius 2a, where a is the radius of the spherical microphone array 100.

Exemplary embodiments are directed to computer based systems for implementing the methods described herein. Such a system can include the spherical array illustrated in FIG. 1, a computer processor having software for accomplishing the front end signal processing and nearfield acoustical holography calculations, and a display device. The system can also include memory or storage for storing raw data, intermediate results, or final results for later processing, an output device for transmitting raw data, intermediate results, or final results to different computer or to another device, or a printer for printing the results. Communications devices can be wired or wireless.

The spherical array can be stationary, or can be mounted on a moving platform for moving the array through a volume which is desired to be acoustically tested. As an example, the array can be moved in or around machinery, ships, land vehicles, or aircraft, in order to locate unwanted acoustic sources. The spherical array can be moved through or around the area to be tested, and the vector intensity can be determined at different positions within the test volume. The vector intensity will indicate the likely source of the sound.

Signal Processing Front End

Turning next to the signal processing front end, the 50 channel analog to digital converter provides 50 channels of digitized data to be processed in the front end. The front end is configured assuming that the acoustic sources outside the away can be random in nature. The signal processing is based on power spectral density analysis, that is, the ensemble averaged cross correlations between the microphones. A set of six vertex microphones is defined, with each of these vertex microphones located at the extremities of the x, y, and z axes of the array, to be used as references. In one example, a single measurement ensemble of length T seconds is 2048 time points and the sample rate is 12000 samples per second. Estimates of cross spectral density functions are computed taking $n_d$ ensemble averages, according to the equation:

$$\hat{S}_{p_i r_j} = \frac{1}{T}\frac{1}{n_d}\sum_{k=1}^{n_d} P_{ki}(f)*R_{kj}(f) = \bar{\varepsilon}[P_{ki}(f)*R_{kj}(f)] \quad \text{Equation (12)}$$

where $P_{ki}(f)$ is the fast fourier transform (FFT) of the pressure at microphone location i for ensemble number k, and $R_{kj}(f)$ is the FFT of the pressure of the microphone at vertex position j. The value of $n_d$ is chosen in the software, and depends on the complexity of the sources that are being studied. When P=R, then $\hat{S}_{pr}$ provides a matrix composed of auto and cross power spectra between the vertex references which are denoted as the matrix $S_{xx}$:

$$S_{xx} = \begin{pmatrix} S_{x1x1} & S_{x1x2} & S_{x1x3} & \dots \\ S_{x2x1} & S_{x2x2} & S_{x2x3} & \dots \\ S_{x3x1} & S_{x3x2} & S_{x3x3} & \dots \\ \dots & \dots & \dots & \dots \end{pmatrix}. \quad \text{Equation (13)}$$

Here, $\bar{\varepsilon}$ represents the ensemble average over the ensemble number k and $$S_{x_i p_j} = \bar{\varepsilon}[R_{ki}(f)*R_{kj}(f)^t]. \quad \text{Equation (14)}$$

Similarly, the cross power spectral densities are computed between the fifty microphone signals and the designated reference set of vertex microphones as:

$$S_{x_i p_j} = \bar{\varepsilon}[R^*_{ki}(f)P_{kj}(f)^t] \quad \text{Equation (15)}$$

Here, the matrix $$S_{xp} = \begin{pmatrix} S_{x1p1} & S_{x1p2} & \dots & S_{x1p50} \\ S_{x2p1} & S_{x2p2} & \dots & S_{x2p50} \\ \dots & \dots & \dots & \dots \\ S_{x6p1} & \dots & \dots & S_{x6p50} \end{pmatrix}. \quad \text{Equation (16)}$$

Note that in Equation (13)-(16), the orders of the references are ranked in order of average coherence for each frequency. For example x1 is the most highly ranked reference with respect to the average coherence for each frequency, and x2 is the next highly ranked reference with respect to the average coherence for each frequency, and so on.

A Cholsky decomposition is applied to the matrices $S_{xx}$, so the matrix $S_{xx}=T^H T$ and a set of six partial pressure fields $p_{hi}(a,\Omega)$ for i=1, 2, . . . 6 is determined according to the equations:

$$P(f) = \begin{pmatrix} P_{1,1} & P_{1,2} & \dots & P_{1,50} \\ P_{2,1} & P_{2,2} & \dots & P_{2,50} \\ \dots & \dots & \dots & \dots \\ P_{6,1} & \dots & \dots & P_{6,50} \end{pmatrix} = \begin{pmatrix} p_{h1}(a,\Omega) \\ p_{h2}(a,\Omega) \\ \dots \\ p_{h6}(a,\Omega) \end{pmatrix} \quad \text{Equation (17)}$$

and $$P(f) = (T^H)^{-1} S_{xp}. \quad \text{Equation (18)}$$

The rows of the matrix P(f) form M separate holograms ranked in order of importance, each of which can be used to reconstruct the volumetric intensity at a given frequency.

EXAMPLES

In one mode of operation, the system uses partial field decomposition to determine the effect of various acoustic sources on the vector intensity field, by determining the vector intensity at different frequencies generated by each source. A set of reference transducers are placed on suspected noise sources in order to determine the separate effects of different noise sources on the vector intensity field using partial field decompression techniques. The transducers can be accelerometers, microphones, or other sensors.

As a demonstration of operation of the system using partial field decomposition, a 0.4 meter diameter spherical array of 50 microphones is located within the fuselage of an aircraft. A number of accelerometers are placed on the panels and windows, and accelerometers are placed at various locations throughout the fuselage. In this demonstration, 31 accelerometers are placed on the windows and panels, and 8 accelerometers are placed throughout the fuselage. All the microphone transducers are sampled at 12000 samples per second, and recorded digitally on tape for later laboratory processing. A known point source is provided a few centimeters from one of the windows, driven by a pseudorandom signal. The point source acts as an incoherent source to compare with the flow noise excited panels also radiating into the interior, and provides a source so the front-end signal processing can separate multiple incoherent sources.

The demonstration is done again with the point source turned off. The partial field holograms and volumetric intensity maps are determined for both cases and compared, to see if the system can identify the point source, and the flow-noise induced panel source.

The 31 accelerometer references and the loudspeaker drive voltage (a pseudorandom bandpass signal between 500 and 1500 Hz) are all used as the reference set (M=32) to form the auto and cross-spectral density functions $S_{xx}$ and $S_{xp}$ of Eqs. (13) and (15). A set of ensembles (estimates of $X_m(f)$ and $P_i(f)$) was created consisted of 1200 nonoverlapping segments of the time record, each containing 1920 points and Fourier transformed to provide frequency domain data. This was carried out for each microphone and each reference.

Since the sample rate was 12 kHz, the total record was 192 s. The average coherence was then computed from these spectra and the references were ordered as to importance. This was carried out at each frequency (6.25 Hz bins) in the band of interest (500-1400 Hz).

Results for a single frequency bin are presented below, although the results are typical for the other frequency bins. The autospectral density of the accelerometer on the center of one of the panels below the window with the nearby point source showed a maximum in response at 732 Hz indicating a resonance of the panel excited by flow noise. At this frequency the first three partial holograms (the three top rows of the matrix in Eq. (18)) were constructed using the Cholesky method from Eqs (16), (13), and (18).

Figure 7:
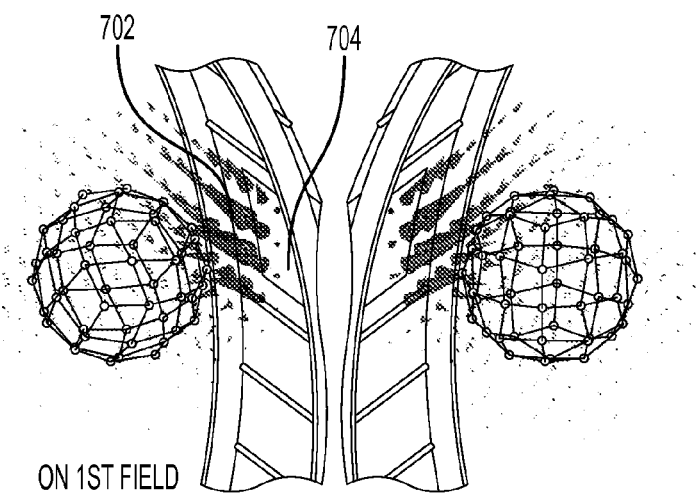
Figure 8:
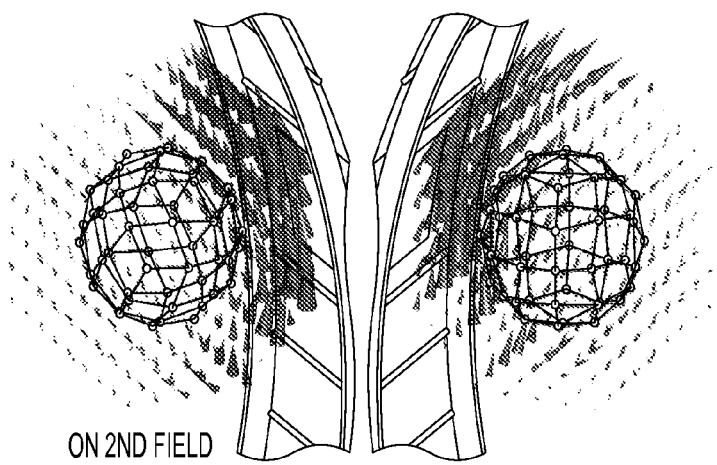
Figure 9:
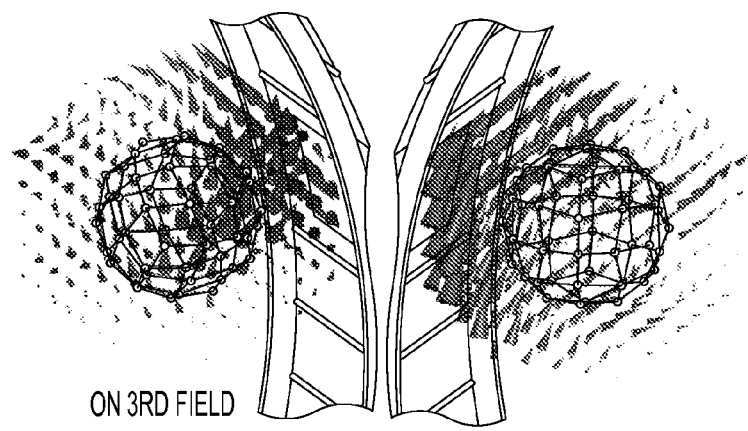

Each of the partial holograms were then processed into volumetric intensity fields using equations (1)-(6). FIG. 7 illustrates the vector intensity fields at 732 Hz for the first partial field near the noise source. The first partial field contained 59% of the total signal energy. The total acoustic energy in vector field shown was 9.9 microjoules. FIG. 8 illustrates the vector intensity fields at 732 Hz for the second partial field. The second partial field contained 18% of the total signal energy. FIG. 9 illustrates the vector intensity field at 732 Hz for the third partial field, which contains 6% of the total signal energy. The first three partial fields contained 84% of the signal energy, indicating that only a small amount (16%) of the signal energy is unaccounted for if M=3. The display can show each partial field, or the M partial fields can be combined in a single display.

Figure 10:
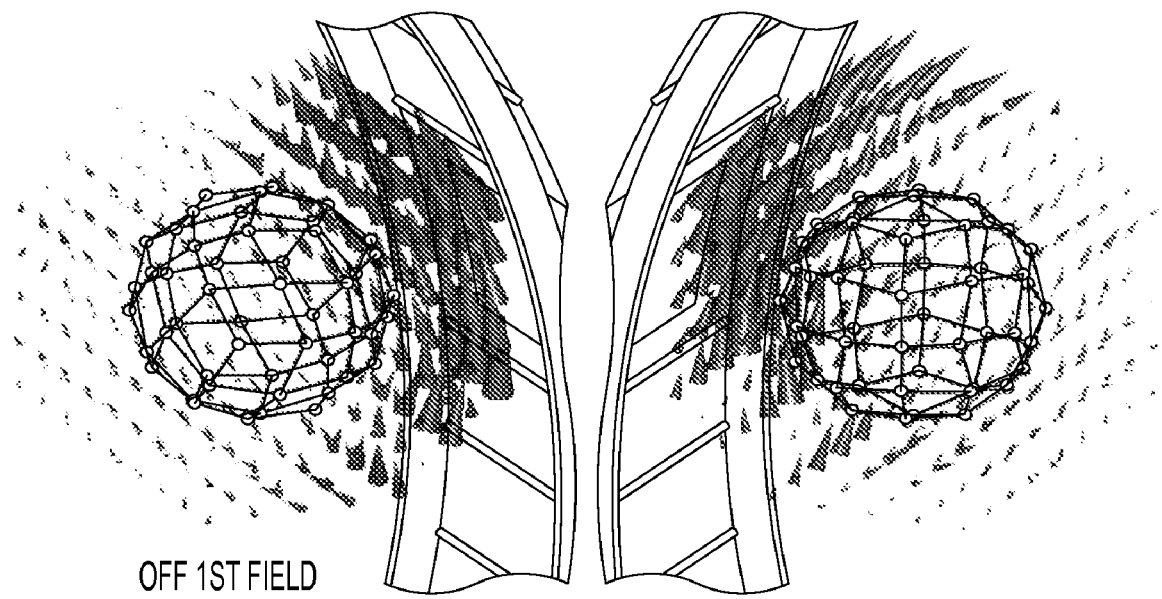
FIGS. 10 and 11 illustrate displays of the first partial field and second partial field of vector intensities with the point source off.
Figure 11:
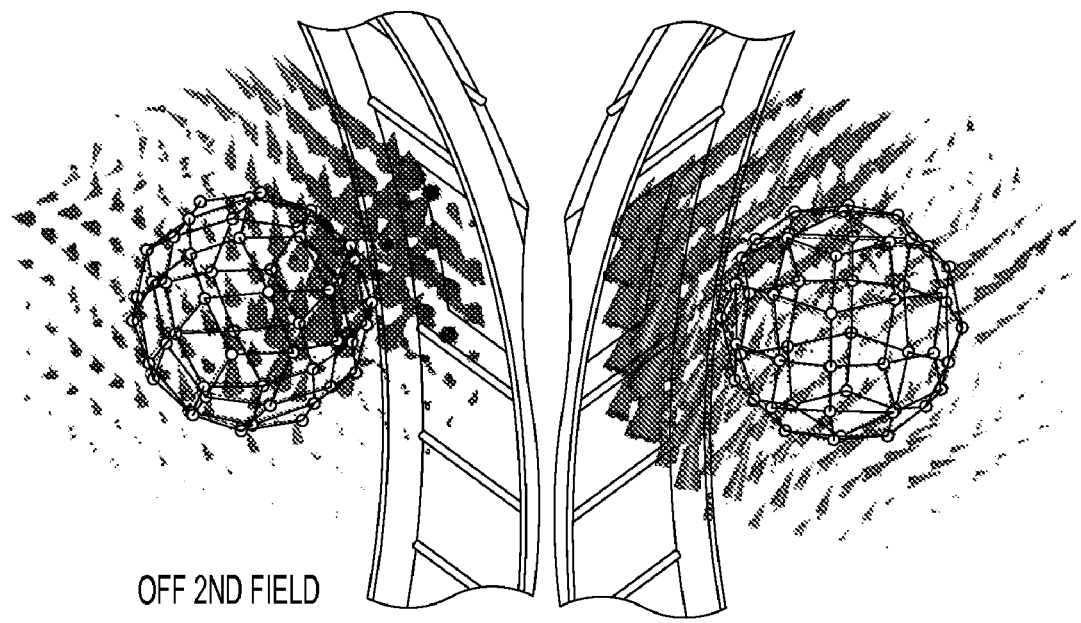

For comparison purposes, FIGS. 10 and 11 illustrate the volumetric intensity field displays for the first and second partial fields when the point source is turned off. Thus, the noise source is simply the normal noise occurring during the aircraft flight. Note that the first partial field in FIG. 10 has a similar profile to the second partial field in FIG. 8, and the second partial field in FIG. 11 has a similar profile to the third partial field in FIG. 9. Thus, the first partial field of FIG. 7 can be determined to result from the point source. Note that the magnitude and location of the largest vectors 702 in FIG. 7 clearly indicates a noise source behind the panel 704, appearing to emanate from an area near the reference accelerometer. The similarity of the fields illustrates that the vector field for the point source was accurately separated from the other incoherent sources.

The foregoing provides an example of a system for determining vector acoustic intensity fields using a spherical or oblate spherical array of acoustic sensors, and a regularization technique that is useful for low frequencies.

The microphones 102 can be any desired sensor for determining acoustic pressure. Examples of suitable microphones include hearing aid microphones, cartridge type microphones, or other microphones. The microphones should be matched in their response as much as possible. One example of a suitable microphone is model 7046I, available from Aco Pacific, Inc. of Belmont, Calif.

Embodiments of the invention are also directed to microphone arrays arranged in an oblate spheroid configuration. Determination of the pressure and velocity will be identically determined as shown for spherical arrays above, with the exception that the Y and j values in the pressure and velocity equations will be different.

Obviously, many modifications and variations of the present invention are possible in light of the above teachings. It is therefore to be understood that the claimed invention may be practiced otherwise than as specifically described.

What is claimed as new and desired to be protected by Letters Patent of the United States is:

1. A system for determining acoustic intensity at locations inside and outside a spherical array of microphones, the system comprising:
    a spherical array of a plurality of microphones;
    an analog to digital converter for digitizing pressure data from each microphone; and
    a processor for determining the acoustic intensity at each location,
    the processor having computer software adapted to apply a regularization filter to spherical wave equations for pressure and velocity.

2. The system according to claim 1, wherein the regularization filter is a predetermined integer dependent on the signal to noise ratio and the frequency.

3. The system according to claim 1, wherein the predetermined integer is higher for larger signal to noise ratios and frequencies.

4. The system according to claim 2, wherein the spherical array has 50 microphones and the predetermined integer is in the range of 1 to 5 for frequencies between 50 and 1000 Hz.

5. The system according to claim 1, wherein the software is adapted to apply the regularization filter to spherical wave equations for pressure and velocity by applying a propagator term $$\sum_{n=0}^{N} \frac{j_n(kr)}{j_n(ka)}$$

to the spherical wave equations, where $j_n$ is a spherical Bessel function, k is the wave number, r is the location where the acoustic intensity is determined, and a is the radius of the spherical array.

6. The system according to claim 1, wherein the acoustic pressure at a location is found according to $$p(r, \theta, \phi) = \sum_{n=0}^{N} \frac{j_n(kr)}{j_n(ka)} \sum_{m=-n}^{n} Y_n^m(\theta, \phi) \sum_{i=1}^{50} Y_n^m(\Omega_i) * \omega_i p_h(a, \Omega_i),$$

wherein $p(r,\theta,\phi)$ is reconstructed acoustic pressure at a location $r,\theta,\phi$, the $Y_n^m(\theta,\phi)$ values are orthonormal spherical harmonic functions of degree n and order m at a point in the volume at angle $(\theta,\phi)$, $p_h(a,\Omega_i)$ is the measured pressure, $Y_n^m(\Omega_i)$ are precomputed spherical harmonics at the spherical angle $\Omega_i$ of the ith microphone in the array, $\omega_i$ values are quadrature weights, and $\rho$ is the density of the media in which the array is located.

7. The system according to claim 1, wherein acoustic velocities are found as $$\dot{u}(r, \theta, \phi) = \frac{1}{i\rho c k} \sum_{n=0}^{N} \frac{j_n(kr)}{r j_n(ka)} \sum_{m=-n}^{n} \frac{\partial Y_n^m(\theta, \phi)}{\partial \theta} \sum_{i=1}^{50} Y_n^m(\Omega_i) * \omega_i p_h(a, \Omega_i),$$

$$\dot{v}(r, \theta, \phi) = \frac{1}{i\rho c k} \sum_{n=0}^{N} \frac{j_n(kr)}{r j_n(ka)} \sum_{m=-n}^{n} \frac{i m Y_n^m(\theta, \phi)}{\sin\theta} \sum_{i=1}^{50} Y_n^m(\Omega_i) * \omega_i p_h(a, \Omega_i),$$

and $$\dot{w}(r, \theta, \phi) = \frac{1}{i\rho c} \sum_{n=0}^{N} \frac{j'_n(kr)}{r j_n(ka)} \sum_{m=-n}^{n} Y_n^m(\theta, \phi) \sum_{i=1}^{50} Y_n^m(\Omega_i) * \omega_i p_h(a, \Omega_i),$$

wherein $p(r,\theta,\phi)$ is reconstructed acoustic pressure at a location $r,\theta,\phi$, the $Y_n^m(\theta,\phi)$ values are orthonormal spherical harmonic functions of degree n and order m at a point in the volume at angle $(\theta,\phi)$, $p_h(a,\Omega_i)$ is the measured pressure, $Y_n^m(\Omega_i)$ are precomputed spherical harmonics at the spherical angle $\Omega_i$ of the ith microphone in the array, $\omega_i$ values are quadrature weights, and $\rho$ is the density of the media in which the array is located.

8. The system according to claim 1, wherein the acoustic intensity is determined at locations within a volume having a radius about two times the radius of the spherical array of microphones.

9. The system according to claim 1, further comprising: a display adapted to show magnitude and direction of calculated acoustic intensity at the locations within and outside the spherical array.

10. The system according to claim 9, wherein the display illustrates at least the partial intensity field having the highest average coherence for a frequency.

11. The system according to claim 9, wherein the display illustrates a plurality of partial intensity fields, ranked in the order of highest average coherence for a frequency.

12. A computer-implemented method for determining acoustic intensity at locations inside and outside a spherical array of microphones, the method comprising:
   receiving by an analog to digital converter time varying acoustic pressure signals from each microphone in a spherical array of microphones;
   digitizing by the analog to digital converter the acoustic pressure signals from each microphone; and
   calculating by a computer processor the vector acoustic intensity at each location, said calculating including applying a regularization filter to spherical wave equations for pressure and velocity.

13. The method according to claim 12, wherein the regularization filter is a predetermined integer dependent on the signal to noise ratio and the frequency.

14. The method according to claim 13, wherein the predetermined integer is higher for larger signal to noise ratios and frequencies.

15. The method according to claim 13, wherein the spherical array has 50 microphones and the predetermined integer is in the range of 1 to 5 for frequencies between 50 and 1000 Hz.

16. The method according to claim 12, wherein said applying the regularization filter to spherical wave equations for pressure and velocity includes applying a propagator term $$\sum_{n=0}^{N} \frac{j_n(kr)}{j_n(ka)}$$

to the spherical wave equations, where $j_n$ is a spherical Bessel function, k is the wave number, r is the location where the acoustic intensity is determined, and a is the radius of the spherical array.

17. The method according to claim 12, wherein the acoustic pressure at a location is found according to $$p(r, \theta, \phi) = \sum_{n=0}^{N} \frac{j_n(kr)}{j_n(ka)} \sum_{m=-n}^{n} Y_n^m(\theta, \phi) \sum_{i=1}^{50} Y_n^m(\Omega_i) * \omega_i p_h(a, \Omega_i),$$

wherein $p(r,\theta,\phi)$ is reconstructed acoustic pressure at a location $r,\theta,\phi$, the $Y_n^m(\theta,\phi)$ values are orthonormal spherical harmonic functions of degree n and order m at a point in the volume at angle $(\theta,\phi)$, $p_h(a,\Omega_i)$ is the measured pressure, $Y_n^m(\Omega_i)$ are precomputed spherical harmonics at the spherical angle $\Omega_i$ of the ith microphone in the array, $\omega_i$ values are quadrature weights, and $\rho$ is the density of the media in which the array is located.

18. The method according to claim 12, wherein acoustic velocities are found as $$\dot{u}(r, \theta, \phi) = \frac{1}{i\rho c k} \sum_{n=0}^{N} \frac{j_n(kr)}{r j_n(ka)} \sum_{m=-n}^{n} \frac{\partial Y_n^m(\theta, \phi)}{\partial \theta} \sum_{i=1}^{50} Y_n^m(\Omega_i) * \omega_i p_h(a, \Omega_i),$$

$$\dot{v}(r, \theta, \phi) = \frac{1}{i\rho c k} \sum_{n=0}^{N} \frac{j_n(kr)}{r j_n(ka)} \sum_{m=-n}^{n} \frac{i m Y_n^m(\theta, \phi)}{\sin\theta} \sum_{i=1}^{50} Y_n^m(\Omega_i) * \omega_i p_h(a, \Omega_i),$$

-continued and $$\dot{w}(r, \theta, \phi) = \frac{1}{i\rho c} \sum_{n=0}^{N} \frac{j'_n(kr)}{j_n(ka)} \sum_{m=-n}^{n} Y_n^m(\theta, \phi) \sum_{i=1}^{50} Y_n^m(\Omega_i) * \omega_i p_h(a, \Omega_i),$$

wherein p(r,θ,φ) is reconstructed acoustic pressure at a location r,θ,φ, the $Y_n^m(\theta,\phi)$ values are orthonormal spherical harmonic functions of degree n and order m at a point in the volume at angle (θ,φ), $p_h(a,\Omega_i)$ is the measured pressure, $Y_n^m(\Omega_i)$ are precomputed spherical harmonics at the spherical angle $\Omega_i$ of the ith microphone in the array, $\omega_i$ values are quadrature weights, and ρ is the density of the media in which the array is located.

19. The method according to claim 12, wherein the acoustic intensity is determined at locations within a volume having a radius about two times the radius of the spherical array of microphones.

20. The method according to claim 12, further comprising:
    displaying magnitude and direction of calculated acoustic intensity at the locations within and outside the spherical array.

21. The method according to claim 20, further comprising:
    displaying at least the partial intensity field having the highest average coherence for a frequency.

22. The method according to claim 20, further comprising:
    displaying a plurality of partial intensity fields, ranked in the order of highest average coherence for a frequency.

* * * * *